United States Patent [19]

Malcolm et al.

[11] Patent Number: 5,037,166

[45] Date of Patent: * Aug. 6, 1991

[54] HOLOGRAPHIC OPTICAL ELEMENT FOR INSTRUMENT PANEL DISPLAYS

[75] Inventors: Richard E. Malcolm, Oakville; Frank Neuperger, St. Catherines, both of Canada

[73] Assignee: Astronautics Corporation of America, Milwaukee, Wis.

[*] Notice: The portion of the term of this patent subsequent to Jan. 17, 2006 has been disclaimed.

[21] Appl. No.: 297,449

[22] Filed: Jan. 13, 1989

Related U.S. Application Data

[63] Continuation-in-part of Ser. No. 136,464, Dec. 22, 1987, Pat. No. 4,798,426, which is a continuation of Ser. No. 915,613, Oct. 6, 1986, abandoned.

[30] Foreign Application Priority Data

Oct. 7, 1985 [CA] Canada .................................. 492407

[51] Int. Cl.⁵ .......................... G02B 5/32; G03H 1/22
[52] U.S. Cl. ........................................ 359/15; 359/33; 359/466
[58] Field of Search ............... 350/130, 132, 133, 134, 350/3.7, 3.72, 3.81, 3.86, 174, 3.6, 3.85

[56] References Cited

U.S. PATENT DOCUMENTS

| | | | |
|---|---|---|---|
| 2,887,297 | 5/1959 | Newton | 242/86 |
| 3,560,921 | 2/1971 | Lopez | 350/3.85 |
| 3,633,989 | 1/1972 | Benton | 350/3.69 |
| 3,824,535 | 7/1974 | Rover, Jr. | 340/27 NA |
| 3,885,095 | 5/1975 | Wolfson | 350/174 X |
| 3,940,204 | 2/1976 | Withrington | 350/3.5 |
| 3,944,322 | 3/1976 | Benton | 350/3.65 |
| 4,021,846 | 5/1977 | Roese | 350/133 X |
| 4,083,239 | 4/1978 | Malcolm et al. | 73/178 R |
| 4,218,111 | 8/1980 | Withrington, et al. | 350/3.72 |
| 4,261,635 | 4/1981 | Freeman | 350/3.72 |
| 4,264,134 | 4/1981 | Ellis | 350/174 |
| 4,309,070 | 1/1982 | Searle | 350/3.7 |
| 4,397,555 | 8/1983 | Malcolm et al. | 356/248 |
| 4,530,564 | 7/1985 | Close | 350/3.69 |
| 4,600,271 | 7/1986 | Boyer et al. | 350/174 |
| 4,613,200 | 9/1986 | Hartman | 350/3.7 |
| 4,730,881 | 3/1988 | Taguchi et al. | 350/3.77 |
| 4,798,426 | 1/1989 | Malcolm et al. | 350/3.7 |

OTHER PUBLICATIONS

"3-D TV", Popular Science, Jun. 1988, pp. 58–63, 110.
Copy of "Statement of Facts by Richard E. Malcolm and Frank Neuperger" filled in prior applications SN 07/136,464 by applicants.

*Primary Examiner*—Bruce Y. Arnold
*Assistant Examiner*—David R. Parsons
*Attorney, Agent, or Firm*—Foley & Lardner

[57] ABSTRACT

A holographic optical system includes a hologram which is located at an instrument panel so as to reflect or transmit an image from a source located off the panel. The image is redirected only to an area at which the viewer may observe the image and is not directed to other areas so as to prevent unwanted reflections and glare such as where the instrument panel is within an aircraft cockpit.

17 Claims, 8 Drawing Sheets 5,037,166

HOLOGRAPHIC OPTICAL ELEMENT FOR INSTRUMENT PANEL DISPLAYS

CROSS-REFERENCE TO RELATED APPLICATIONS

This application is a continuation-in-part of application Ser. No. 07/136,464, filed Dec. 22, 1987, now U.S. Pat. No. 4,798,426 which is a continuation of application Ser. No. 06/915,631, filed Oct. 6, 1986, now abandoned, the disclosures of which are incorporated herein by reference.

BACKGROUND OF THE INVENTION

This invention relates to a display system. In a situation such as in an aircraft, where space is limited, there is a restriction on the number of instruments and displays that will fit in a given amount of panel space. For example, it would be desirable to locate an artificial horizon display near other navigational and control displays in fighter aircraft at the top of the instrument panel. However, in most modern fighters, the artificial horizon is placed near the bottom of the instrument panel, and the pilot, with his oxygen mask on, must alter his direction of gaze by more than 30° to check the instrument. Problems of size and space restrictions for instruments are heightened by the need for redundancy of critical instruments. Due to the tight space restrictions, the panel layouts are not easily modified when an aircraft is reconfigured.

Conventional cockpit displays are typically of two types—electro-mechanical and cathode ray tube (CRT)—although liquid crystal displays, light emitting diode displays, and electroluminescent displays are also used. Beyond the space restrictions, other problems of conventional instrument displays include the production of canopy glare from instrument lighting which is distracting to the pilot. Conventional electro-mechanical multi-instrument panels are complex and the servicing of such panels is time-consuming and expensive. Electro-mechanical instruments provide a limited symbology, i.e. they are limited to alphanumeric characters or mechanical analog dials and read-outs.

To increase the amount of information displayed on the instrument panel without increasing the space requirements of the instruments, it may be desirable to selectively project an image, such as an image of an artificial horizon, onto a portion of the instrument panel which is occupied by existing switches, key pads, controls, and other non-display components. However, such light projection can be impractical because of the power required to compete with direct sunlight, and since normal reflection would introduce light into the cockpit area as unwanted reflections and glare, including reflections off of the cockpit canopy, a particularly significant problem during night-time flying.

SUMMARY OF THE INVENTION

In the present invention, information display on the instrument panel is obtained by reflecting from or transmitting through a display screen symbolic information projected from a source, such as a cathode ray tube (CRT), into the pilot's eyes.

For a reflection type display screen, the pilot sees the additional information as being overlaid on the existing instruments, controls and panel. The reflected symbols are designed to be sufficiently distinct from those already in use on the panel that they would not be confused with each other. In addition, the medium of the display is located in such a way as not to interfere with the normal operation of the instruments or controls over which it is superimposed.

The display screen can be in the form of a medium which can be applied over existing controls or instruments on an instrument panel, and cut out, if necessary, so as to permit knobs or touch keys to protrude through the screen. The superior surfaces of the knobs or keys can be covered in the same medium, so as to substantially fill the area over which it has been applied. The medium is optically clear, so as not to interfere with the viewing of the controls or instruments over which it has been applied.

The display screen medium behaves as a reflector or transmitter of high efficiency for a specific, narrow bandwidth of light and may be optically clear to all other visible light. The diffuse reflecting or transmitting properties of the medium are optimized such that an observer at a specific distance from the medium is able to see the display image only if his eyes are within a predetermined area. This property of the display prevents its luminence from being directly radiated into areas where it is not desired. The medium is referred to herein as the projection or display screen.

Further objects, features, and advantages of the invention will be apparent from the following detailed description when taken in conjunction with the accompanying drawings.

DESCRIPTION OF THE PREFERRED EMBODIMENT

Figure 1:
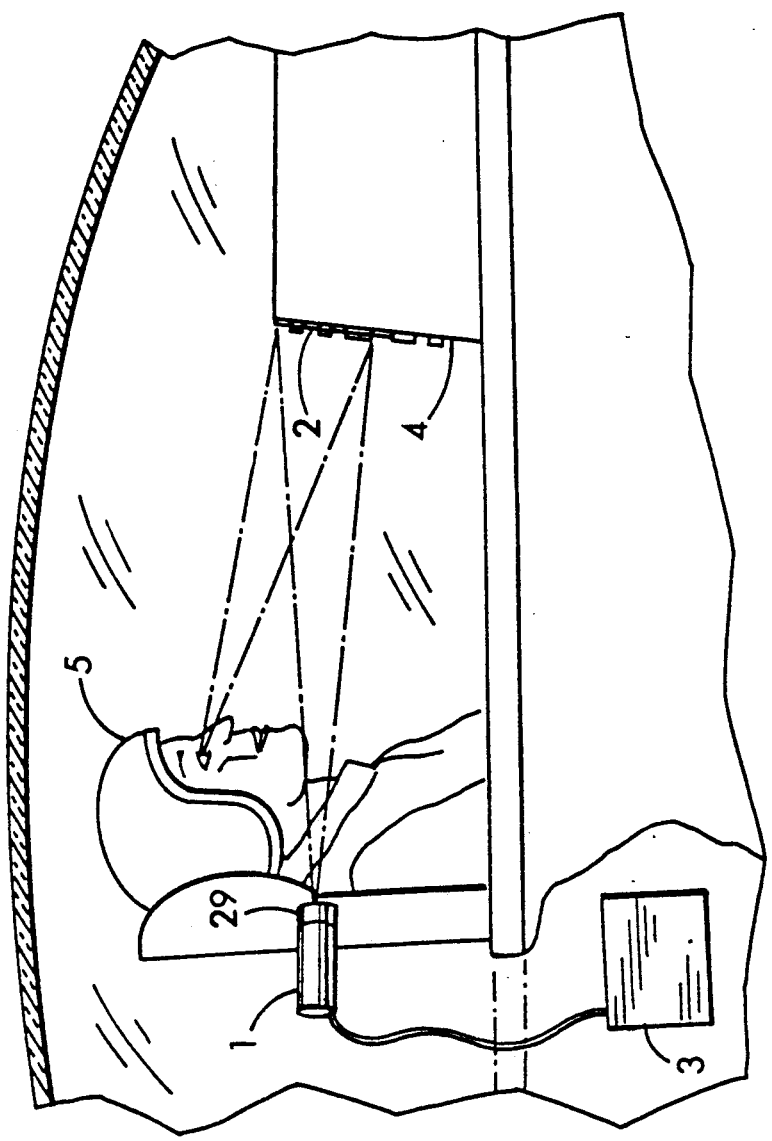
FIG. 1 is an exemplary layout of the display system of the invention, where the display information is reflected off of the projection screen.

The typical layout of the display system of the invention is shown in FIG. 1. The display system consists of a projector 1, projection screen 2, and the necessary electronics 3 to support the projector 1. The projection screen 2 is mounted in a position which is overlaying a section of the instrument panel 4, and which is shown magnified in FIG. 3. It can be seen that the projection screen 2 is not perpendicular to the projector 1 nor to the observer 5.

The instrument panel 4 is a device that depicts a large amount of symbolic information about the status and situation of the aircraft to the pilot. The instrument panel 4 also contains a number of devices that allow the pilot to present information to the aircraft, such as display selection, altimeter settings, weapons set-up, engine controls, etc. Input to the aircraft is accomplished by means of various knobs, switches, and buttons. The instruments are arranged so that they are functionally grouped, and all of the instruments must be visible from the "design eye," i.e., the area of the normal head position and the normal range of head movements of all pilots who will fly the aircraft. The knobs, switches, and buttons must all be reachable by the pilot without moving from his normal flying position, with the exception of those items used only infrequently, or during start-up or shut-down.

Figure 2:
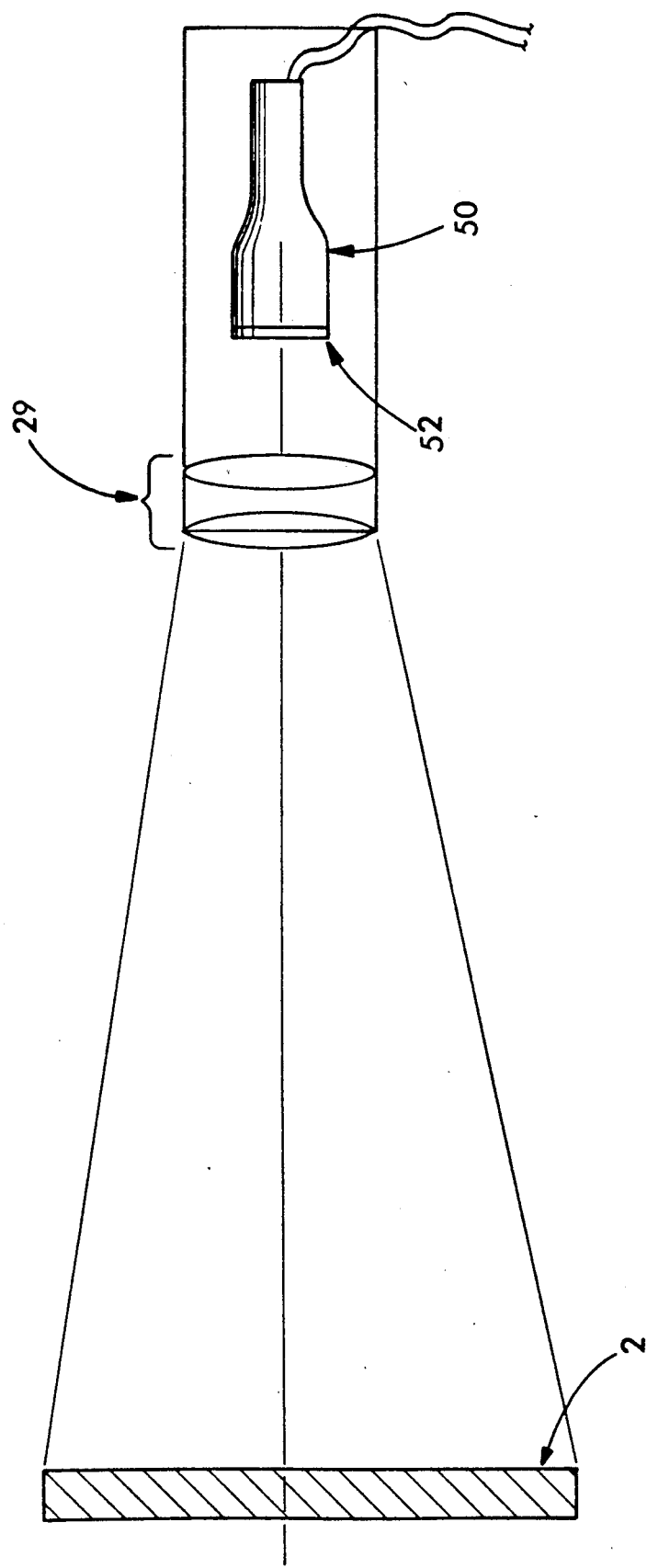
FIG. 2 is a layout showing detail of a projector in accordance with the present invention.

As shown in FIG. 2, the projector 1 consists of a 1-1.5 inch diameter cathode ray tube (CRT) 50 with a phosphor coating 52 of narrow spectral emission such as P-43, and a relay lens assembly 29. The relay lens assembly 29 consists of conventional optical elements but may be implemented using holographic optical elements the properties of which are well known to those skilled in the art of holography. The optical elements may be tilted and decentered to accommodate for the aberations that arise from the fact that the projector is not perpendicular to the projection screen. The aperture of the relay lens assembly 29 is preferably two inches in diameter, and the focal length is preferably such as to yield a 5X magnification of the CRT image when focused on the projection screen 2.

The projection screen 2 is implemented as a holographic optical element sandwiched between two layers of fine Lexan, polymethyl methacrylate (PMMA), Plexiglas, or glass, or, conversely, embossed on a suitable plastic such as Mylar polyester, or made from a holographic material such as Polaroid DMP 128 (T.M. Reg'd), all of which are techniques well known in the art. The media for making the master holographs may be dichromated gelatin, while the techniques for making the holographic optical element (HOE) are well-known two-step processes for generating image-plane holograms. The source of light for generating the holograms is a green laser with its spectral output in the vicinity of the spectral emission of P-43 phosphor. Any small difference in matching the wavelengths can be compensated for by adjusting the geometry of the exposures, a technique which is well known in the art.

Figure 3:
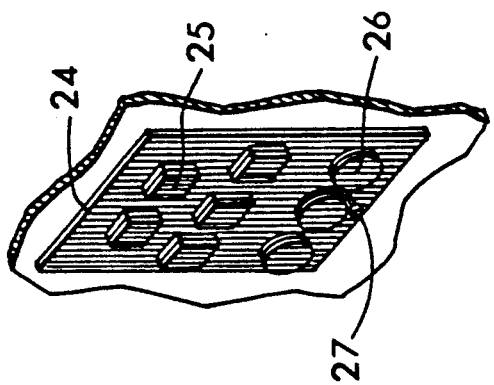
FIG. 3 is a perspective view of a projection screen in accordance with the invention mounted over a section of an instrument panel.

FIG. 3 shows more clearly how the resulting HOE, which makes up the projection screen, is superimposed over the existing features of the instrument panel, such as gauges 26, switches 25, and the panel itself 24. Since the switches 25 extend outwardly from the panel, the HOE is cut or punched out to permit said extension through the HOE, and the cut out portions can be affixed to the surface of said switches, so as to provide a more or less continuous surface when seen from the optimal viewing area. Knobs, or other such narrow features 27 would simply protrude through the HOE and would not be covered with a holographic "cap".

Figure 4:
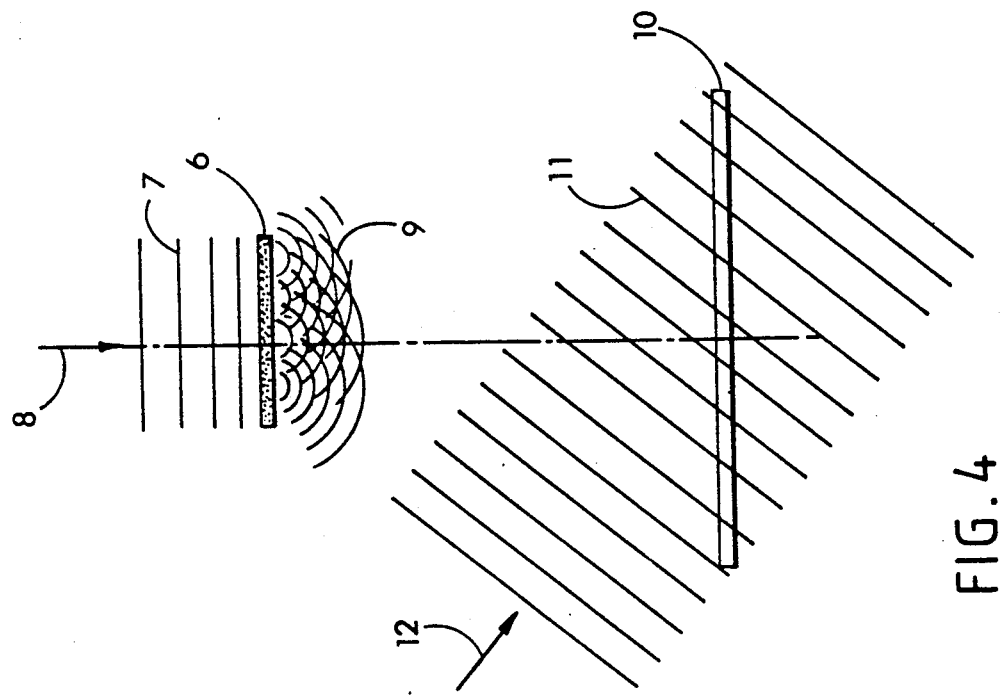
FIG. 4 illustrates the geometry required to construct the transmission master hologram.

FIG. 4 illustrates the geometry required to construct the transmission master hologram. The object to be holographed is an optical diffuser plate 6 which is backlit with a wave front 7 propagating in a direction indicated by the arrow 8. This will cause the diffuse light 9 to fall primarily on the film plate 10, which is dichromated gelatin or other such photographic material as is usual for holography. The plate 10 is also illuminated by a reference wave front 11 propagating in the direction indicated by the arrow 12. After suitable exposure, the plate 10 is appropriately processed to yield the transmission master hologram 13.

Figure 5:
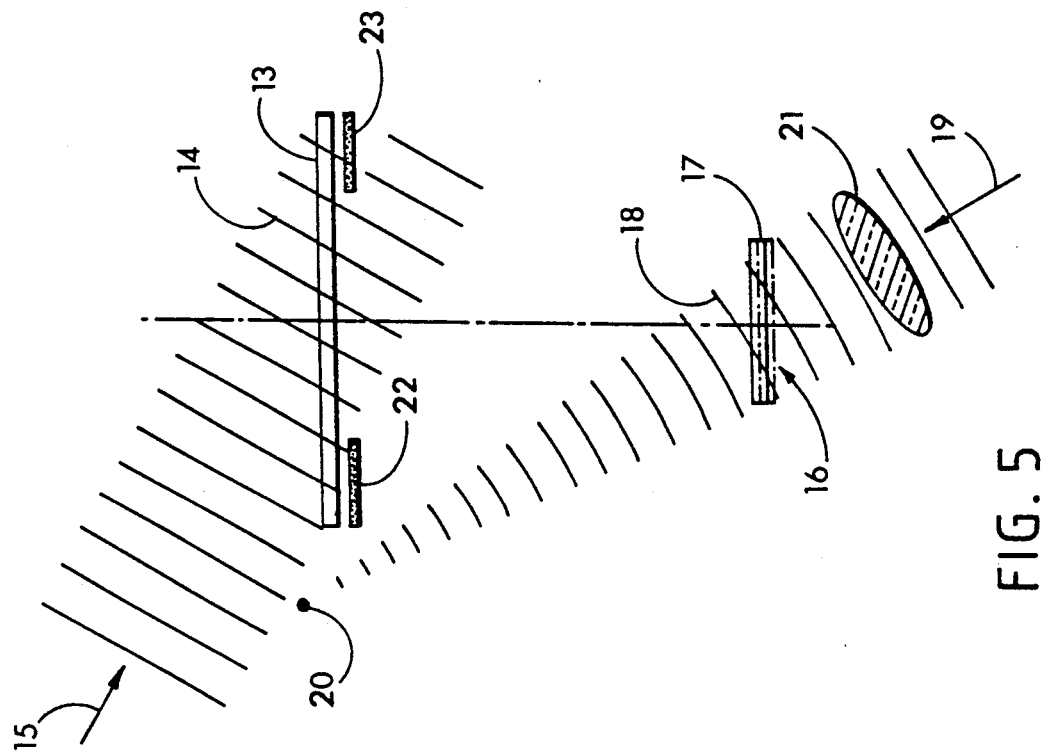
FIG. 5 illustrates the geometry required to construct the reflection copy hologram which comprises the projection screen.

FIG. 5 illustrates the geometry required to construct the reflection copy hologram which will comprise the projection screen. The transmission master hologram 13 is illuminated with wave front 14 which is the conjugate of wave front 11. Wave front 14 is propagating in the direction indicated by the arrow 15. This conjugate illumination accomplishes the spatially undistorted projection of a real image of the diffuser 16. Film plate 17 is placed adjacent to the real image of the diffuser 16 and is illuminated by a reference wave front 18 which propagates in the direction of arrow 19. The reference wave front 18 is converged to the point 20 by a lens 21. Point 20 relative to the film plate 17 represents the relative location of the projector 1 with respect to the projection screen 2 in FIG. 1.

The transmission master hologram is masked by opaque material 22, 23 in a way such that the unmasked area corresponds to the observer's optimal viewing area(s). After suitable exposure and subsequent processing, the film plate 17 becomes a reflection copy hologram which comprises the projection screen of the display system. In commercial production, the plate 17 may be produced by holographic, printing or embossing techniques which are well-known in the art.

When the reflection copy hologram is used as the projection screen 2, in the geometry illustrated in FIG. 1, it will have the following properties: An image comprised of symbols generated on the face of the CRT will be projected onto the projection screen; an observer placing his eyes in the viewing area will see the image, magnified 5X, coplanar or not with the projection screen; the optimal viewing area will be uniformly illuminated with the light reflecting from the projection screen, by virtue of the diffusing element; no light will be reflected into areas other than the optimum viewing area; and the projection screen will reflect only the light from the CRT, and will appear otherwise substantially transparent, so that symbols and features beneath the projection screen will be clearly visible through the projection screen.

Figure 6:
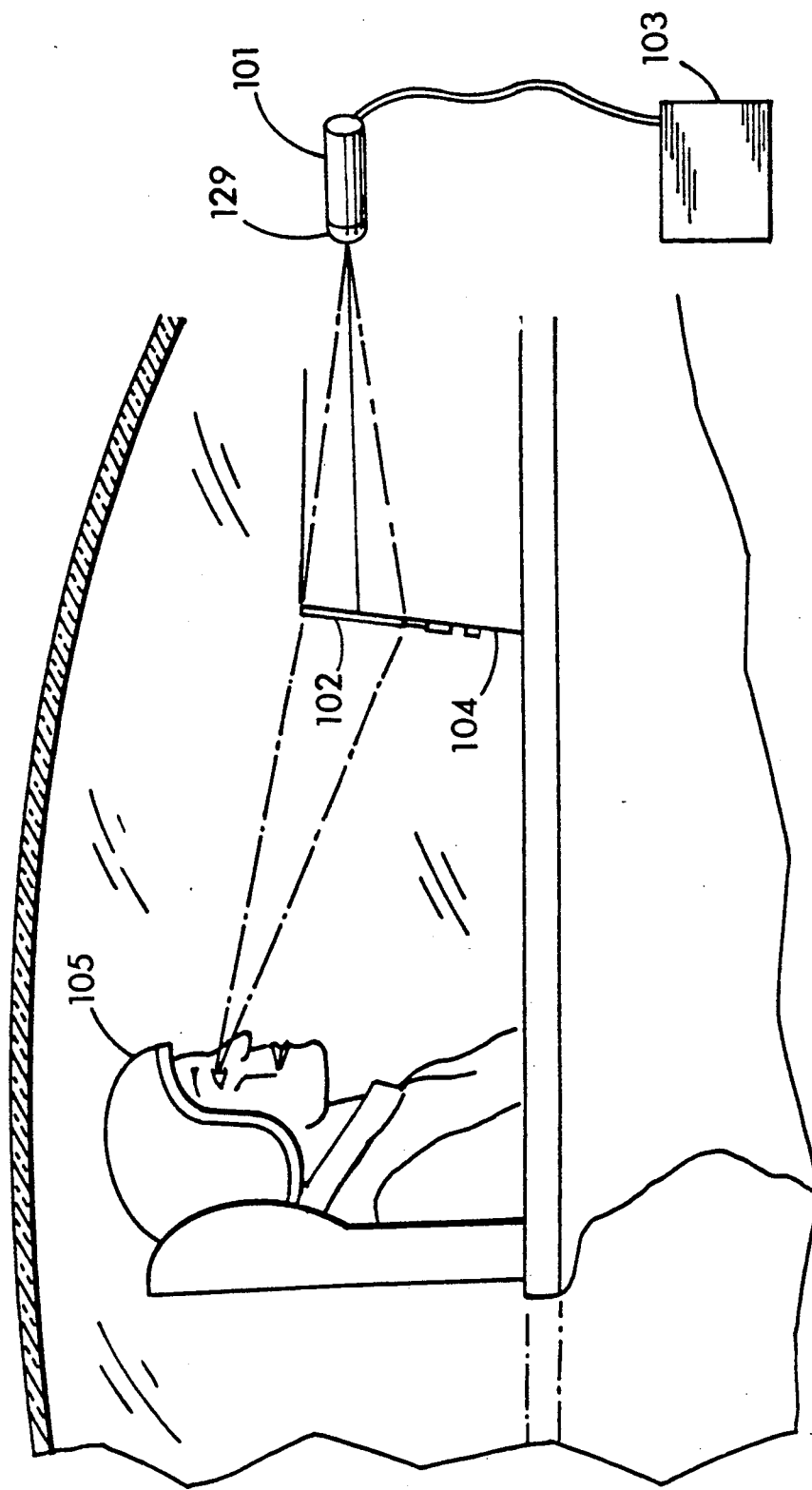
FIG. 6 is an exemplary layout of the display system of the invention where the display information is transmitted through the projection screen, and where the recording geometry for projection and the viewing axes are not coaxial.

The instrument panel 4 may alternately employ a transmission hologram rather than the above-described reflection hologram. The transmission holographic instrument panel is analogous to the hologram of the reflection variety, except for the location of the CRT projector. As shown in FIG. 6, the projector 101 is located behind the instrument panel 104, facing the "design eye" of the observer 105. The projector 101 is supported by electronics 103 FIG. 6 illustrates the use of a transmission hologram 102 where the projection and viewing axes are not coaxial. The light projected from the CRT projector 101 is focused onto the hologram 102 of the holographic instrument panel 104 by means of the relay lens assembly 129. The hologram 102 is unimpeded by other features of the instrument panel and causes all of the light emanating from the relay lens 129 to be directed toward the design eye of the observer 115. This is a task that requires, among other things, that the HOE act as a semi-diffuser, since the design eye is a virtual aperture rather than a point in space.

Achromatization of the HOE display screens may be accomplished by varying the thickness of dichromated gelatin emulsion and using other well known practices. This may be done if it is necessary to display full color images from a full color projector or from a plurality of different monochrome projectors of different colors.

Figure 7:
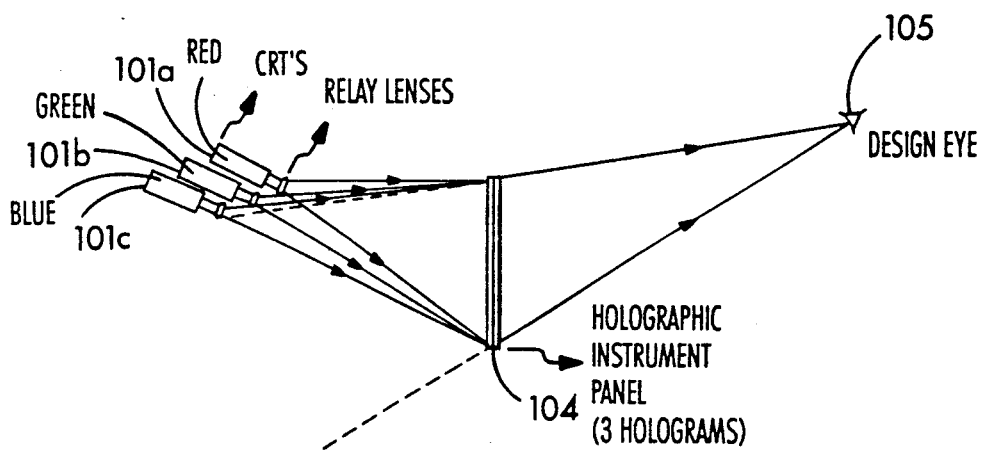
FIG. 7 is an exemplary layout of the display system of the invention where the display information is transmitted by three independent projectors of different colors, each of the projectors transmitting different information.
Figure 8:
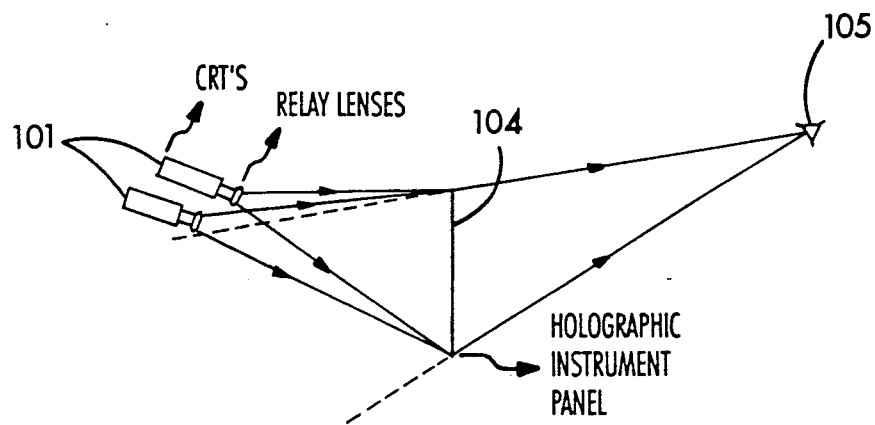
FIG. 8 is an exemplary layout of the display system of the invention where the display information is transmitted by two projectors of identical colors, each of the projectors transmitting the same information to provide redundancy.
Figure 9:
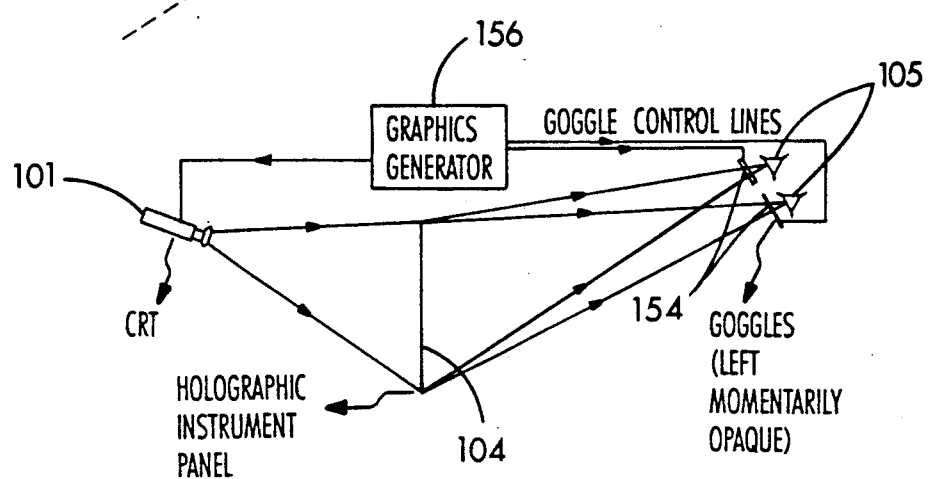
FIG. 9 illustrates an exemplary geometry which may be used in the present invention to create a stereoscopic image.

FIG. 7 shows a holographic display for an instrument panel which is illuminated by three projectors 101a, 101b and 101c, each presenting a different primary color although it is apparent that a single multicolor CRT projector may also be used. In practice the projectors 101a, 101b, and 101c should be positioned out of the line of sight of the observer 105, otherwise the images on the projectors may be seen directly through the holograms. This happens because the holograms, as a practical matter, are not 100% efficient at redirecting the light focused upon them. As a consequence, some of the light from the projectors will pass through the holographic instrument panel as though the holograms were not there, and interfere with the viewing of the intended image. The positioning of the projectors and relay lenses out of the line of sight can be done in many ways, including the use of mirrors. FIGS. 7-9 show only that the projectors are located to one side of the line of sight.

If a hologram is made from three beams, a reference and two object beams, then upon viewing, both objects will be visible. In like manner, the light from two separately located projectors could be directed toward the design eye by a single hologram. FIG. 8 shows how such an arrangement can be used to satisfy the requirement for redundancy. Two projectors 101 of identical colors simultaneously have their images focused onto the holographic instrument panel 104 by their respective relay lenses. With suitable care, the images will overlap and appear as a single image, if both projectors are displaying identical images. If one of the projectors should fail, then the image from the other one would remain, and the only effect noticed by the viewer is that the brightness is diminished to half of the original. The above principle could be used to provide redundancy for each of the three primary colors, such as are projected by the projectors 101a, 101b, and 101c of FIG. 7. It should be apparent that the use of redundant projectors would apply equally to both transmission and reflection holograms.

It would be possible to have the holographic instrument panel present images which appear to be three-dimensional. This can be done in several ways. As shown in FIG. 9, the most effective is to have a liquid crystal lightgate or shutter 154 positioned in front of each eye 105, by means of a pair of goggles. Signals from a computer 156 alternately render each crystal opaque, then clear. The two gates or shutters alternate exactly out of phase with each other, so that when one eye can see, the other can not, and vice versa. This alternation is synchronized with the times at which the computer 156 generates the images on the CRT projector, so that while the left eye was viewing the CRTs would be showing the image appropriate for the left eye and so forth. The system could be made to run at 60 Hz or faster, so that the viewer would not be aware of the flicker. Rather the observer would simply see a different image in each eye, which would be interpreted by the brain as normal stereopsis. Suitable systems for carrying out this function are commercially available, as described in the article entitled "3-D TV", Popular Science, June 1988, pp. 58-63, 110. In the event that the system should fail, it can be so designed that the liquid crystal shutters fail in the clear mode, and if that should happen, the computer can be instructed to present only one image, as with all the other examples described above.

Figure 10:
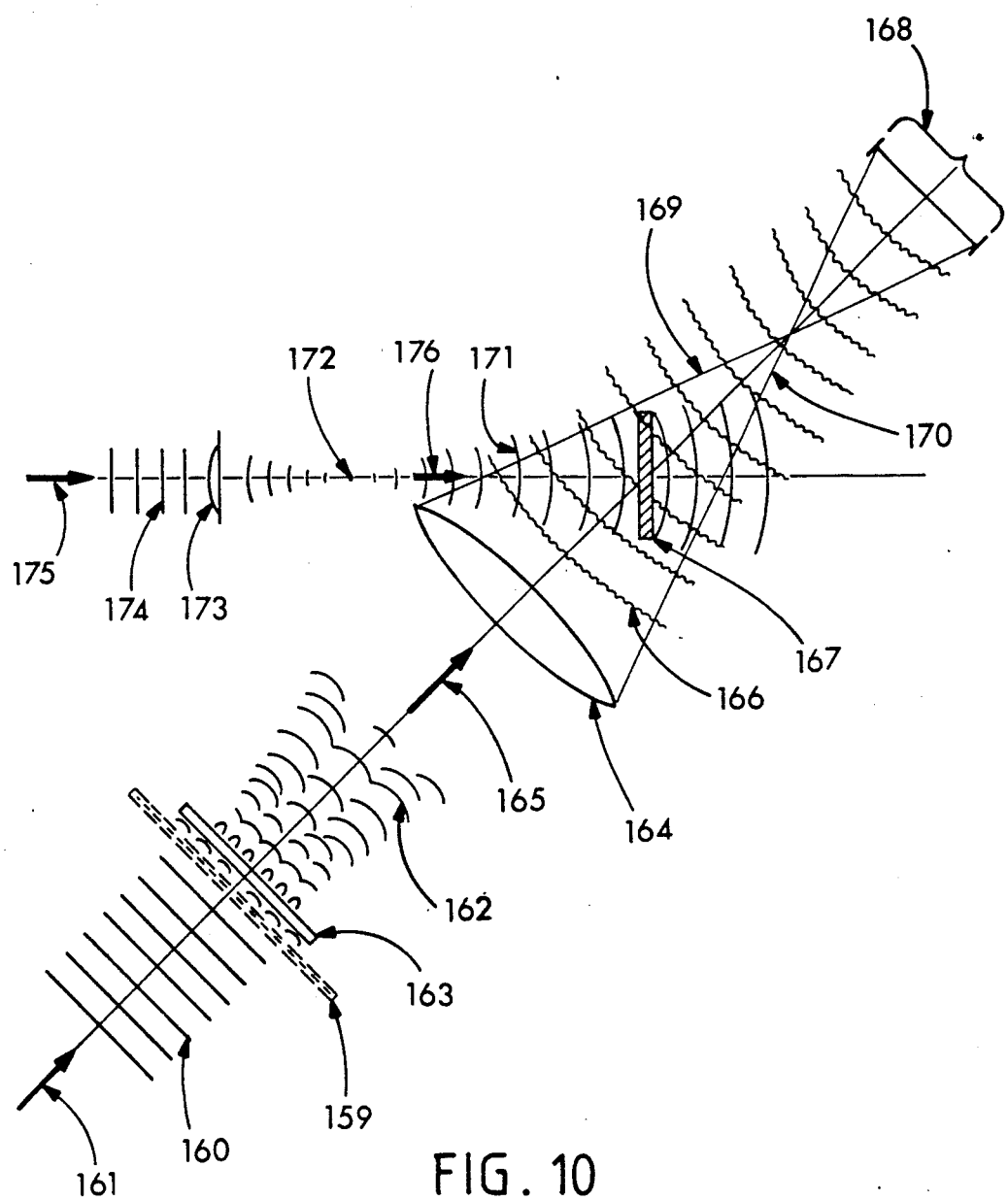
FIG. 10 illustrates the geometry required to construct the holographic optical element that is used in a display where information is transmitted through the projection screen and where the projection and viewing axes are not coaxial.

FIG. 10 illustrates the geometry required to construct the holographic optical element in a transmission mode where the projection and viewing axes are not coaxial. The source of light for generating the holograms is a green laser with its spectral output in the near vicinity of the spectral emission of P-43 phosphor. Any small differences in spectra can be compensated for by a small adjustment in the geometry of the exposures. All other practices that are well-known to those skilled in the art of holography such as vibration isolation, path length matching, liquid gates, etc. are assumed.

The object to be holographed is an optical diffuser plate 159 which is back-lit with a wave front 160 propagating in a direction indicated by an arrow 161. When the wave front 160 passes through the diffuser 159, the light appears to emanate from many point sources, as depicted by 162. The now diffuse wave front 162 is windowed and/or apodized by a film transparency 163 and propagated towards a lens 164 as indicated by an arrow 165. The lens 164 relays the image of the apodized and windowed diffuser via an object wave front 166 through a film plate (for example, of dichromated gelatin) 167 and an observer's viewing window 168. The focal length of the lens 164 and the location of the diffuser 159 and the film transparency 163 are dependent on the required shape and location of the observer's viewing window 168 and may be calculated using well-known optics formulae that relate the relaying of images through lenses. The film plate 167 must be entirely located in a triangular area bounded by a line 169, a line 170, and the lens 164. The lines 169 and 170 are lines of convergence from the perimeter of the lens 164.

A reference wave front 171 is made to appear to emanate from a point 172 by the focusing properties of a lens 173 which is illuminated by a wave front 174 propagating in a direction indicated by an arrow 175. The reference wave front 171 propagates in the direction indicated by an arrow 176 and passes through the film plate 167, totally illuminating the film plate 167. The reference wave front 171 must not pass through the lens 164 before it illuminates the film plate 167. The interference pattern formed by the reference wave front 171 and the object wave front 166 exposes the film plate 167. After suitable exposure time and subsequent processing, the film plate 167 becomes a transmission hologram which comprises the projection screen 102 of the display system of FIG. 6. The wave front 174 and the wave front 160 are derived from a common green laser source and thus maintain a common phase relationship to each other.

Multiple viewing windows may be generated by having a plurality of transparent areas on the film transparency 163 or a multiplicity of diffuser/transparency/lens arrangements. Multiple exposures of the film plate 167 using different diffuser/transparency/lens arrangements while retaining the same reference beam would also yield multiple viewing windows.

The film transparency 163 is made of a transparent substrate such as plastic or glass and is covered with a material that blocks the passage of light in varying amounts. The pattern of the light blocking material on the film transparency 163 is distributed in accordance with the requirements of the observer viewing window 68 as seen through the lens 164. The relationship of the pattern on the film transparency 163 to the shape and intensity profile requirements of the observer viewing window 168 as seen through the lens 164 is related using well-known formulae for the relaying of images through lenses.

It should be noted that in using the recording method shown in FIG. 10, the geometry may be modified such that the observer viewing window 168 and the reference wave front 171 may have angles of orientation with respect to the film plate 167 which can be varied to allow for off axis projection angles or on axis observer viewing windows. The limitation of this recording geometry is that having an on axis observer viewing window and on axis projection is not possible simultaneously.

Figure 11:
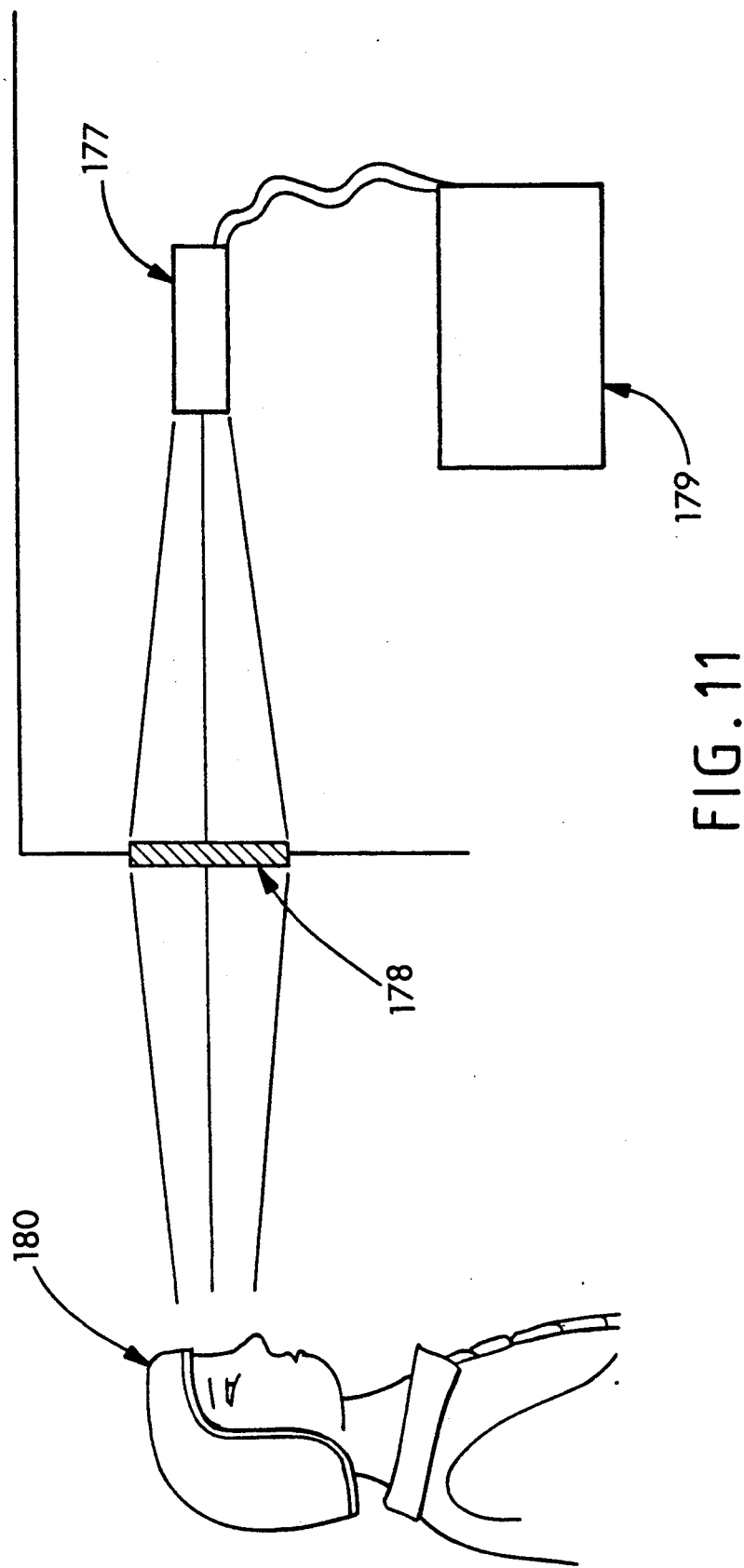
FIG. 11 is an exemplary layout of the display system of the invention when the display information is transmitted through the projection screen, and where the projection and the viewing axes are coaxial.

A typical layout of the display system for a transmission hologram where the projection and viewing axes are coaxial is shown in FIG. 11. The display system comprises a projector 177, a projection screen 178, and the necessary electronics 179, to support the projector 177. It can be seen that the projection screen 178 is perpendicular to the observer 180 as well as to the projector 177.

Figure 12:
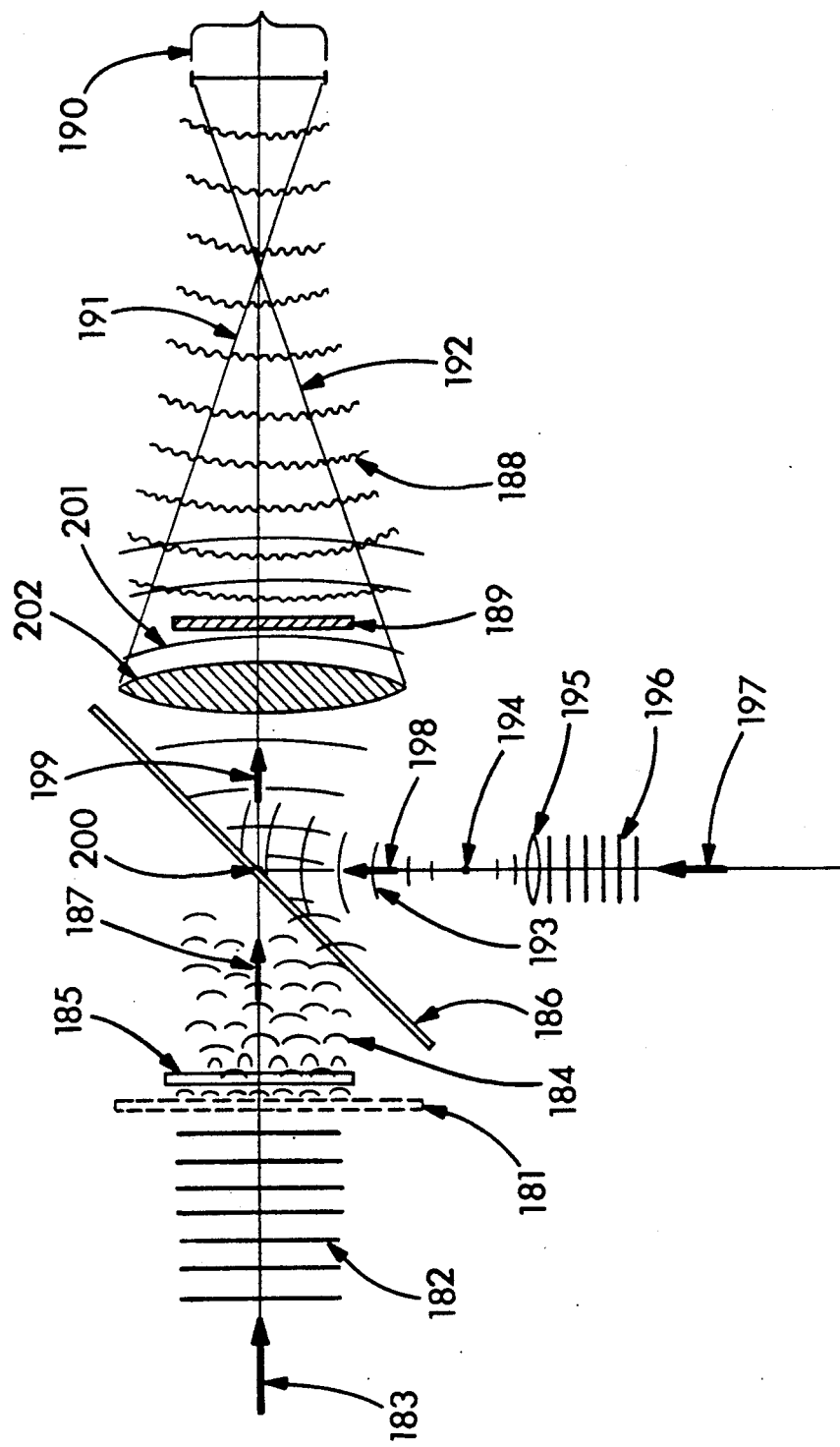
FIG. 12 illustrates the geometry required to construct the holographic optical element where the display information is transmitted through the projection screen and where the recording geometry for the projection and the viewing axes are coaxial.

FIG. 12 illustrates the geometry required to construct the holographic optical element in a transmission hologram where the projection and viewing axes are coaxial. The source of light for generating the holograms is a green laser with its spectral output in the near vicinity of the spectral emission of P-43 phosphor. Any small difference in spectra can be compensated for by a small adjustment in the geometry of the exposures. All other practices that are well-known to those skilled in the art of holography, such as vibration isolation, path length matching, etc. are assumed.

The object to be holographed is an optical diffuser plate 181 which is back-lit with a wave front 182 propagated in a direction indicated by an arrow 183. When the wave front 182 passes through the diffuser plate 181, the light appears to emanate from many point sources as depicted by 184. The now diffuse wave front 184 is windowed and apodized by a film transparency 185 and propagates towards a beam splitter 186 as indicated by an arrow 187. The diffuse wave front 184 passes through the beam splitter 186 and a lens 202 relays the image of the apodized and windowed diffuser via an object wave front 188 through a film plate (dichromated gelatin) 189 to an observer's viewing window 190. The focal length of the lens 202 and the location of the diffuser 181 and film transparency 185 are dependent on the required shape and location of observer's viewing window 190 and may be calculated using well-known optics formulae that relate the relaying of images through lenses. The film plate 189 must be located entirely within a triangular area bounded by a line 191, a line 192, and the lens 202. The lines 191 and 192 are lines of convergence from the perimeter of the lens 202.

A reference wave front 193 is made to appear to emanate from the point 194 by the focusing properties of a lens 195 which is illuminated by a wave front 196 propagating in a direction indicated by an arrow 197. The reference wave front 193 propagates in the direction indicated by an arrow 198, substantially reflects from the beam splitter 186, is redirected in a direction indicated by an arrow 199 and passes through the lens 202. By the optical combining properties of the beam splitter 186, the reference beam 193 is made to appear to be emanating from a direction which is to the left of perpendicular to the lens 202. When viewed from the location of the film plate 189 due to optical refracting properties of the lens 202, the distance from which the reference beam appears to be coming is longer than the sum of the distances from the film plate 189 to a point 200 and from the point 200 to the point 194. The distance from which the reference beam appears to be coming must match the distance between the projector 177 and the display screen 178 in FIG. 10. Knowing the distance between the projector 177 and the display screen 178 and knowing the focal length of the lens 202 allows the required location of point 194 to be easily calculated using well-known formulas that relate conjugate points of refracting lenses.

The reference beam 193 which is reflected towards the lens 202 by the beam splitter 186 is refracted through the lens 202 and passes through the film plate 189 totally illuminating the film plate 189 as a refracted reference wave front 201. The refracted reference wave front 201 must totally illuminate the film plate 189. The interference pattern formed by the refracted reference wave front 201 and the object wave front 188 exposes the film plate 189. After suitable exposure time and subsequent processing the film plate 189 becomes a transmission hologram which comprises the projection screen 178 of the display system of FIG. 11. The wave front 196 and the wave front 182 are derived from a common green laser source and thus maintain a common phase relationship to each other.

Multiple viewing windows may be generated by having a plurality of transparent areas on the film transparency 185 or a multiplicity of diffuser/transparency/lens arrangements. Multiple exposures of the film plate 189 using different diffusers/transparency/lens arrangements while retaining the same reference beam would also yield multiple viewing windows.

The film transparency 185 is made of a transparent substrate such as plastic or glass and is covered with a material that blocks the passage of light in varying amounts. The pattern of the light blocking material on the film transparency 185 is distributed in accordance with the requirements of the observer viewing window 190 as seen through the lens 202. The relationship of the pattern on the film transparency 185 to the shape and intensity profile requirements of the observer viewing window 190 as seen through the lens 202 is related using well-known formulae for the relaying of images through lenses.

It is understood that the invention is not limited to the particular embodiments set forth herein, but embraces such modified forms thereof as come within the scope of the following claims.

What is claimed is:

1. A holographic optical system for use with an instrument panel, the holographic optical system comprising:
   (a) a hologram positioned so as to redirect an image generated at a place other than the instrument panel, the hologram being formed to act in the manner of a diffuser and such that the viewing window of the redirected image is controlled so as to prevent light from the hologram from shining towards regions other than a region to be occupied by the viewer's head; and
   (b) means for producing an image at a position away from the instrument panel and for projecting and focusing the image onto the hologram.

2. The holographic optical system of claim 1 wherein the hologram is superimposed with and positioned on or adjacent an existing instrument of an instrument panel.

3. The holographic optical system of claim 2 wherein the hologram has holes cut into it through which project mechanical features of the instrument panel such as knobs, keys and switches.

4. The holographic optical system of claim 3 wherein portions of the features which protrude through the hologram are themselves covered with holograms having substantially the same function as the background hologram.

5. The holographic optical system of claim 1 wherein the image is redirected to transmit through the hologram to the side of the instrument panel opposite the means for producing, projecting and focusing an image.

6. The holographic optical system of claim 1 wherein the means for producing and projecting and focusing the image includes a cathode ray tube located remote from the instrument panel and facing generally towards said panel.

7. The holographic optical system of claim 6 wherein the means for producing and projecting and focusing the image includes a relay lens receiving light from the cathode ray tube.

8. The holographic optical system of claim 1 wherein the hologram is formed directly onto a sheet of clear material such as plastic.

9. The holographic optical system of claim 1 wherein the hologram is formed of a number of smaller holograms, each one directed so as to redirect the image toward the viewer's eyes.

10. The holographic optical system of claim 1 wherein there are a plurality of holograms and an equal plurality of means for producing, projecting and focusing images, each of the holograms producing an image dissimilar and independent of the other holograms and having a corresponding means for producing, projecting and focusing that image.

11. The holographic optical system of claim 1 wherein there are a plurality of holograms and an equal plurality of means for producing, projecting and focusing images, each of the holograms producing identical images and having a corresponding means for producing and projecting that image.

12. The holographic optical system of claim 11 wherein the plurality of images are in alignment.

13. The holographic optical system of claim 11 further including a pair of controllable light gates wherein a viewer of the image produced away from the instrument panel has a light gate in front of each eye which alternates phases between opaque and clear so that when one gate is opaque the other gate is clear and vice versa, and wherein the plurality of means for producing and projecting images is synchronized with the alternation of phases of the gates so that during the clear phase of each gate the holographic optical system produces an image appropriate to the particular eye behind that gate to create stereopsis.

14. A method of generating an image for use with an instrument panel, the method comprising the steps of:
   (a) producing an image at a position away from the instrument panel;
   (b) projecting and focusing the image onto a hologram at the instrument panel;
   (c) redirecting the image with the hologram to a viewing window located at a place other than the instrument panel so as to prevent light from shining towards regions other than a region to be occupied by the viewer's head.

15. The method of claim 14 wherein the step of redirecting the image is accomplished by transmitting through the hologram with the hologram being formed to transmit the light of the image in a direction off axis from the direction in which the light of the image was projected onto the hologram.

16. The method of claim 14 wherein the step of redirecting the image is accomplished by reflecting off of the hologram.

17. The method of claim 16 wherein the hologram is superimposed with and positioned on or adjacent an existing instrument of the instrument panel.

* * * * *

UNITED STATES PATENT AND TRADEMARK OFFICE
CERTIFICATE OF CORRECTION

PATENT NO. : 5,037,166

DATED : August 6, 1991

INVENTOR(S) : Richard E. Malcolm; Frank Neuperger

It is certified that error appears in the above-identified patent and that said Letters Patent is hereby corrected as shown below:

On the title page: Item [75]:

The order of the inventors should be --Frank Neuperger, St. Catherines; Richard E. Malcolm, Oakville, both of Canada--

Signed and Sealed this

Twenty-seventh Day of April, 1993

*Attest:*

MICHAEL K. KIRK

*Attesting Officer*     *Acting Commissioner of Patents and Trademarks*